United States Patent
Li et al.

(10) Patent No.: US 11,401,198 B2
(45) Date of Patent: Aug. 2, 2022

(54) SILICATE PRODUCT AND STRENGTHENING METHOD THEREOF

(71) Applicant: TUNGHSU GROUP CO., LTD., Shijiazhuang (CN)

(72) Inventors: Debao Li, Shijiazhuang (CN); Qing Li, Shijiazhuang (CN); Zihan Shen, Shijiazhuang (CN); Feng Guo, Shijiazhuang (CN); Ruhua Gong, Shijiazhuang (CN); Zhonghua Wang, Shijiazhuang (CN); Jiajia Chen, Shijiazhuang (CN)

(73) Assignee: TUNGHSU GROUP CO., LTD., Shijiazhuang (CN)

( * ) Notice: Subject to any disclaimer, the term of this patent is extended or adjusted under 35 U.S.C. 154(b) by 463 days.

(21) Appl. No.: 16/327,350

(22) PCT Filed: Aug. 10, 2017

(86) PCT No.: PCT/CN2017/096879
§ 371 (c)(1),
(2) Date: Feb. 22, 2019

(87) PCT Pub. No.: WO2018/120846
PCT Pub. Date: Jul. 5, 2018

(65) Prior Publication Data
US 2019/0218134 A1 Jul. 18, 2019

(30) Foreign Application Priority Data
Dec. 30, 2016 (CN) .......................... 201611255858.8

(51) Int. Cl.
*C03C 3/085* (2006.01)
*C03C 21/00* (2006.01)
*C03C 3/087* (2006.01)
*C03C 23/00* (2006.01)

(52) U.S. Cl.
CPC .............. *C03C 3/085* (2013.01); *C03C 3/087* (2013.01); *C03C 21/002* (2013.01); *C03C 23/0065* (2013.01)

(58) Field of Classification Search
CPC ......... C03C 3/085; C03C 3/087; C03C 21/00; C03C 23/0065
See application file for complete search history.

(56) References Cited

U.S. PATENT DOCUMENTS

| 5,780,371 A * | 7/1998 | Rifqi ....................... C03C 3/093 501/67 |
| 2007/0003796 A1* | 1/2007 | Isono ................... G11B 5/8404 428/832 |
| 2012/0111056 A1* | 5/2012 | Prest ...................... C03C 21/002 65/30.14 |
| 2012/0216570 A1 | 8/2012 | Abramov |
| 2012/0297829 A1* | 11/2012 | Endo ....................... C03C 3/087 65/30.14 |
| 2013/0011650 A1* | 1/2013 | Akiba ..................... C03C 3/087 428/220 |

(Continued)

FOREIGN PATENT DOCUMENTS

| CN | 1139914 A | 1/1997 |
| CN | 102795766 A | 11/2012 |

(Continued)

OTHER PUBLICATIONS

Bookstein, Joseph, MD and Bookstein, Fred, PhD, Plasminogen-enriched Pulse Spray Thrombolysis with tPA: Further Developments, JVIR, Nov.-Dec. 2000, pp. 1353-1362, vol. 1, La Jolla, USA.

(Continued)

*Primary Examiner* — Elizabeth A. Bolden
(74) *Attorney, Agent, or Firm* — Myers Wolin, LLC

(57) ABSTRACT

Provided is a silicate article comprising $SiO_2$, $Al_2O_3$, $Na_2O$, $K_2O$, MgO and $ZrO_2$, wherein the content of $Al_2O_3$ is 15-28 parts by weight, the content of $Na_2O$ is 13-25 parts by weight, the content of $K_2O$ is 6-15 parts by weight, the content of MgO is 7-16 parts by weight, and the content of $ZrO_2$ is 0.1-5 parts by weight, relative to 100 parts by weight of $SiO_2$; and M is 5-13, as calculated by the following formula: $M=P_1*wt(Na_2O)+P_2*wt(K_2O)+P_3*wt(MgO)+P_4*wt(ZrO_2)-P_5*wt(Al_2O_3)*(Al_2O_3)$. In the formula, $P_1$ has a value of 0.53, $P_2$ has a value of 0.153, $P_3$ has a value of 0.36, $P_4$ has a value of 0.67, and $P_5$ has a value of 0.018. The invention further provides a method for chemically strengthening the silicate article, wherein the Young's modulus and the surface compressive stress value of the silicate article can be further improved by using an ultrasonic treatment or both an ultrasonic treatment and a microwave treatment during the chemical strengthening process; furthermore, the tendency of the compressive stress value to change with depth and the depth of a layer of compressive stress can be controlled, thereby effectively preventing spontaneous burst, or slow cracking after collision.

19 Claims, No Drawings

(56) References Cited

U.S. PATENT DOCUMENTS

| | | | |
|---|---|---|---|
| 2013/0302618 A1 | 11/2013 | Kuhnemann et al. | |
| 2015/0044473 A1 | 2/2015 | Murata et al. | |
| 2016/0221863 A1 | 8/2016 | Murata et al. | |
| 2016/0355430 A1 | 12/2016 | Yamazaki et al. | |
| 2017/0001903 A1* | 1/2017 | Miyasaka | C03C 3/087 |
| 2017/0313620 A1* | 11/2017 | Kashima | C03C 15/00 |
| 2018/0194700 A1* | 7/2018 | Pan | B01J 23/002 |
| 2018/0265397 A1* | 9/2018 | Murayama | C03C 3/087 |
| 2020/0024187 A1* | 1/2020 | Gong | C03C 3/085 |
| 2020/0399173 A1* | 12/2020 | Amin | C03C 23/006 |
| 2021/0198141 A1* | 7/2021 | Lee | C03C 21/002 |

FOREIGN PATENT DOCUMENTS

| | | | |
|---|---|---|---|
| CN | 103803786 | 5/2014 | |
| CN | 104986954 | 10/2015 | |
| CN | 105060703 A | 11/2015 | |
| CN | 105110636 | 12/2015 | |
| CN | 105130211 A | 12/2015 | |
| CN | 105439445 A | 3/2016 | |
| CN | 105948488 A | 9/2016 | |
| CN | 105985018 | 10/2016 | |
| CN | 105985018 A | 10/2016 | |
| CN | 106082704 | 11/2016 | |
| CN | 106132888 A | 11/2016 | |
| CN | 106854037 | 6/2017 | |
| CN | 106865982 A * | 6/2017 | C03C 4/0092 |
| JP | 46-38515 A | 11/1971 | |
| JP | 2008-204521 A | 9/2008 | |
| JP | 2012-250861 A | 12/2012 | |
| JP | 2013-544220 A | 12/2013 | |
| JP | 2014-091675 A | 5/2014 | |
| JP | 2015-151329 A | 8/2015 | |
| KR | 10-2013-0084687 | 7/2013 | |
| KR | 10-2014-0055649 | 5/2014 | |
| KR | 20150044667 A | 4/2015 | |
| WO | WO 2015125584 | 8/2015 | |
| WO | 2015/147092 A1 | 10/2015 | |
| WO | WO-2015147092 A1 * | 10/2015 | C03C 21/002 |
| WO | WO2016117476 A1 | 7/2016 | |
| WO | WO-2017126607 A1 * | 7/2017 | C03C 21/00 |

OTHER PUBLICATIONS

ARIPO Form No. 18, Harare Protocol, Notification of Non-Compliance with Substantive Requirements and Invitation to Submit Observations and/or Amended Application, with Addendum to Form 18, issued by the African Regional Intellectual Property Organization (ARIPO), for corresponding African Patent Application No. AP/P/2019/011692, dated May 3, 2021.

* cited by examiner

SILICATE PRODUCT AND STRENGTHENING METHOD THEREOF

TECHNICAL FIELD

The present invention relates to the field of silicate articles and the manufacture thereof and in particular relates to a glass plate, especially a glass cover plate used for display devices.

BACKGROUND ART

With the rapid development of modern technologies, the touch screen has become the first choice in many electronic display products. A cover plate glass as the outermost layer of a touch screen is one of key materials for the touch screen. In recent years, electronic display products have been required to be lightweight and thin; therefore, the cover plate glass for protecting electronic display products is also gradually thinning.

However, when the cover plate glass is made thin in thickness, the strength thereof is also reduced, and the cover plate glass itself may sometimes be broken, or affected by cracks that would lead to slow cracking, due to dropping and the like during use or carrying; in addition, during long-term use, there may be scratches on the surface, and if the scratches are relatively deep, slow cracking of the glass also tends to occur.

Even in the case of chemically strengthened glass cover plates, cracking may also sometimes occur, or slow cracking starts from a scratch that has penetrated the layer of compressive stress.

CN 105102394 A discloses a glass plate and a manufacturing method thereof; however, it focuses on suppressing the warpage of the glass plate after chemical strengthening, without considering the matching among the components and the influence of the chemical strengthening process on the strength and the crack resistance.

CN 102639457 A discloses a glass plate and a manufacturing method thereof, wherein it focuses on suppressing the dissolution of $Na^+$ to the surface, thereby suppressing peeling of an anti-reflection film or a transparent conductive film on a glass surface, resulting in a glass plate that is excellent in weather resistance; however, the matching among the components and the influence of the chemical strengthening process on the strength and the crack resistance are not considered.

Therefore, there is a need to develop a glass cover plate that is resistant to rapid cracking and slow cracking.

In addition, the chemical resistance of the glass plate in the prior art is also unsatisfactory, so that the glass plates may be corroded by acid excessively fast during chemical thinning procedure, which tends to cause uneven corrosion, easily forming tiny defective dots or grooves on the surface of the glass, resulting in a decrease in the surface compressive stress value, which tends to cause cracks.

The inventors of the present application found that the strength of the glass cover plate can be remarkably improved by controlling the respective components of the glass and the contents thereof to satisfy a specific matching relationship, and this can not only prevent rapid cracking of the glass cover plate but also can prevent slow cracking thereof effectively.

Furthermore, the inventors have surprisingly found that although increasing the compressive stress value and the thickness of the layer of compressive stress can enhance the strength of the glass to prevent the glass being rapidly cracked after collision, if the compressive stress and the depth of the layer of compressive stress are increased blindly, spontaneous burst or slow cracking may easily occur after collision or scratching; in addition, the inventors have surprisingly found that such spontaneous burst or slow cracking after collision can be effectively prevented by further controlling the tendency of the compressive stress value to change with depth and the depth of the layer of compressive stress.

SUMMARY OF THE INVENTION

An objective of the present invention is to provide a glass composition and a glass plate, which can solve the problem that glass plates would undergo rapid cracking and spontaneous burst after collision, or slow cracking after collision or scratching in the prior art.

In order to achieve the above-mentioned objective, the present invention provides a glass composition comprising $SiO_2$, $Al_2O_3$, $Na_2O$, $K_2O$, MgO and $ZrO_2$, wherein the content of $Al_2O_3$ is 15-28 parts by weight, the content of $Na_2O$ is 13-25 parts by weight, the content of $K_2O$ is 6-15 parts by weight, the content of MgO is 7-16 parts by weight, and the content of $ZrO_2$ is 0.1-5 parts by weight, relative to 100 parts by weight of $SiO_2$.

and M is 5-13, as calculated by the following formula (1):

$$M = P_1 * wt(Na_2O) + P_2 * wt(K_2O) + P_3 * wt(MgO) + P_4 * wt(ZrO_2) - P_5 * wt(Al_2O_3) * wt(Al_2O_3) \quad (1)$$

wherein wt ($Na_2O$) represents the part by weight of $Na_2O$ relative to 100 parts by weight of $SiO_2$, wt ($K_2O$) represents the part by weight of $K_2O$ relative to 100 parts by weight of $SiO_2$, wt (MgO) represents the part by weight of MgO relative to 100 parts by weight of $SiO_2$, wt ($ZrO_2$) represents the part by weight of $ZrO_2$ relative to 100 parts by weight of $SiO_2$, and wt ($Al_2O_3$) represents the part by weight of $Al_2O_3$ relative to 100 parts by weight of $SiO_2$.

In the formula, $P_1$ has a value of 0.53, $P_2$ has a value of 0.153, $P_3$ has a value of 0.36, $P_4$ has a value of 0.67, and P5 has a value of 0.018.

Preferably, the value of M is 6-10, further preferably 6.5-9, and further preferably 7-8.

Preferably, the content of $Al_2O_3$ is 18-25 parts by weight, the content of $Na_2O$ is 17-23 parts by weight, the content of $K_2O$ is 7-12 parts by weight, the content of MgO is 8-14 parts by weight, and the content of $ZrO_2$ is 0.8-2 parts by weight, relative to 100 parts by weight of $SiO_2$.

Preferably, the content of $Al_2O_3$ is 22 parts by weight, the content of $Na_2O$ is 19 parts by weight, the content of $K_2O$ is 9 parts by weight, the content of MgO is 12 parts by weight, and the content of $ZrO_2$ is 1.4 parts by weight, relative to 100 parts by weight of $SiO_2$.

Preferably, the glass composition of the present invention further comprises a certain amount of SrO, the content of SrO being 0-3 parts by weight, preferably less than 0.6 parts by weight, relative to 100 parts by weight of $SiO_2$.

Preferably, the glass composition of the present invention further comprises BaO and CaO, the content of BaO being 0-2 parts by weight, preferably less than 0.5 parts by weight, and the content of CaO being 0-2 parts by weight, preferably less than 0.5 parts by weight, relative to 100 parts by weight of $SiO_2$.

Preferably, the glass composition of the present invention has a 10% HF acid/20° C./20 min corrosion amount of less than 38 $mg/cm^2$.

Preferably, the glass composition of the present invention has a Young's modulus of higher than 65 GPa, further preferably higher than 75 GPa.

The present invention further provides a glass plate made from the glass composition of the present invention.

Furthermore, the ratio of a surface compressive stress value at a depth of 3 μm of the glass plate of the present invention to that at a depth of 7 μm, and the thickness of a layer of compressive stress are calculated by the following formula (2), and the resulting value of the crack resistance factor K should be less than 8.

$$K=Q_1*(x/y)^2+Q_2*(x/y)-Q_3*d/10 \quad (2)$$

wherein x is the surface compressive stress value at a depth of 3 μm of the glass, and y is the surface compressive stress value at a depth of 7 μm of the glass, in unit of MPa; and d represents the thickness of a layer of compressive stress, in unit of μm;

wherein $Q_1$ has a value of 3.5, $Q_2$ has a value of 1.8, and $Q_3$ has a value of 0.12.

Preferably, the crack resistance factor K is less than 7.7, further preferably less than 7.3.

Preferably, the glass plate has a 10% HF acid/20° C./20 min corrosion amount of less than 38 mg/cm².

Preferably, the glass plate has a Young's modulus of higher than 65 GPa, further preferably higher than 75 GPa.

The present invention further provides a method for preparing a chemically strengthened glass plate, comprising manufacturing a glass composition into a plate-shaped article, and chemically strengthening the plate-shaped article.

During the chemical strengthening treatment, the temperature of a molten salt is 380° C.-450° C., preferably 390° C.-420° C., and more preferably 400° C., and the immersion time is 0.3-9 hours, preferably 1-8 hours, further preferably 2-7 hours, further preferably 3-6 hours, and more preferably 4-5 hours.

Preferably, ultrasonic vibration is added during the chemical strengthening.

The ultrasonic wave has an average acoustic energy density of 50-60 W/L and an ultrasonic frequency of 25-40 kHz.

The temperature of the ultrasonic treatment is 380° C.-425° C., preferably 390° C.-410° C., and more preferably 400° C.; and the treatment time is 10-80 min, preferably 15-50 min, and more preferably 20-40 min.

Preferably, the ultrasonic treatment is carried out at intervals, wherein the time interval between ultrasonic treatments is 1-40 min, preferably 3-35 min, and more preferably 5-20 min; and the ultrasonic treatment time each time is 10-80 min, preferably 15-50 min, and more preferably 20-40 min.

Further preferably, while performing the chemical strengthening with ion exchange, microwave radiation is applied to the surface of the glass, further preferably performed alternately with the ultrasonic treatment.

The frequency range of the microwave is 1.1-6.2 GHz, preferably 2.6-4.6 GHz, more preferably 3.0-4.0 GHz, and most preferably 3.3-3.5 GHz.

The duration of application of the microwave is 5-60 min, preferably 10-40 min, and most preferably 12-25 min.

The time interval of application of the microwave is 2-30 min, preferably 5-20 min, and more preferably 7-15 min; and the duration of application of the microwave each time is 5-60 min, preferably 10-40 min, and most preferably 12-25 min.

The glass plate of the present invention can be used for flat panel displays.

The present invention further provides a flat panel display made from the glass plate of the present invention.

The inventors of the present invention surprisingly found, by means of mathematical fitting, that the effect of each component in the glass on the physical and chemical properties of the glass shows a special law; and where the contents of the components other than silicon oxide change linearly, since the coefficients for the contents of these components are different, the influences thereof on the value of M in formula (1) are different, and accordingly, the change in the value of M is presented as a curve, that is to say, there is an optimal point value. When the content of each component further satisfies the range of the value of M as shown in formula (1), the Young's modulus, surface compressive stress value, crack resistance and chemical resistance of the glass plate, as measured upon testing, are optimized, and either an excessively large value or an excessively small value of M may result in a decrease in the above-mentioned properties of the glass plate.

For example, the inventors of the present application have surprisingly found that when the content of $Al_2O_3$ is 20 parts by weight, the content of $Na_2O$ is 19 parts by weight, the content of $K_2O$ is 9 parts by weight, the content of MgO is 10 parts by weight, and the content of $ZrO_2$ is 0.9 parts by weight, relative to 100 parts by weight of $SiO_2$, the value of M is 8.5, and at this point, the glass has the optimal resistance to cracking and slow cracking, and such an abrupt change in performance is beyond the general expectations of a person skilled in the art. If an ultrasonic treatment and a microwave treatment are employed during the chemical strengthening, and the treatment conditions thereof are optimized (see Example 8 and Example 9), the resulting effect of resistance to cracking and slow cracking would be unpredictable to a person skilled in the art.

The inventors of the present application found that the surface stress value at a certain depth of the glass and the thickness of a layer of stress thereof are calculated according to the formula (2), and when the calculated value of the crack resistance factor K is less than 8, the glass plate of the present invention has a higher Young's modulus, a preferred compressive stress value distribution, and a preferred stress layer thickness. If the compressive stress value changes too rapidly with depth, the calculated value of the crack resistance factor K will be too large, and which means that the glass plate is prone to spontaneous burst during use and also slow cracking after collision.

Furthermore, the glass plate of the present invention has a higher Young's modulus and a stronger chemical corrosion resistance.

According to the present invention, the above-mentioned method for preparing the glass plate may involve using a conventional common means, which may be, for example, an overflow down-draw process, a slot down-draw process, a redraw process, a float process, etc.

It is easy to allow the value of the crack resistance factor K as defined by the present invention to be less than 8 by the following chemical strengthening process, specifically as follows:

with regard to the chemical strengthening process, common means in the art may be employed as long as $Li_2O$ and $Na_2O$ on the surface layer of the glass plate can be ion-exchanged with $Na_2O$ and $K_2O$ in a molten salt, for example, such a method may be employed, which involves immersing a glass plate in a hot molten salt of sodium nitrate ($NaNO_3$), a molten salt of potassium nitrate ($KNO_3$), or a mixed molten salt thereof. Optionally, the glass plate can be first immersed in a nitrate including $NaNO_3$, and then immersed in a nitrate including $KNO_3$. During the chemical strengthening, although stirring can also accelerate the movement of ions, a stagnant region tends to be present during stirring, and the speed is not easy to control. Preferably, an ultrasonic vibration is added during the chemical strengthening to improve the movement of relevant ions (e.g., $K^+$) in the ion-exchange liquid. Since the relevant ions (e.g., $K^+$) are displaced into the surface of the glass, these ions (e.g., $K^+$) near the surface of the glass are deficient with a decreased concentration; the addition of the ultrasonic vibration can make a rapid compensation for these ions (e.g., $K^+$) near the surface of the glass, meanwhile enabling the ions exchanged out (e.g., $Na^+$) to leave rapidly, thereby reducing the concentration of these ions (e.g., $Na^+$) near the surface of the glass, so that the speed of the ion exchange is increased and the extent of the ion exchange is more thorough.

Further preferably, after one ultrasonic treatment is done, there is a time interval before a second ultrasonic treatment; and by means of such a treatment at intervals, the molten salt liquid tends to be stabilized during the interval, and a certain period of time is provided for the alkali metal ion exchange on the surface of the glass accordingly.

Further preferably, it may also be possible to apply microwave radiation to the surface of the glass. When the microwave radiation is applied to the surface of the glass, the alkali ion components in the glass vibrate in response to the microwave, thereby slightly loosening intermolecular bonding structures of the glass and generating heat. Furthermore, ions with large particle diameters in the ion exchange liquid also vibrate due to the microwave, thereby increasing the activity of the ions and generating heat; accordingly, the ion exchange reaction of the glass can also be facilitated, thereby shortening the time of the ion exchange of the glass. Preferably, the microwave is also used intermittently; and further preferably, the ultrasonic wave and the microwave are used in an alternating manner. By means of microwave radiation, the depth of the ion exchange of the glass can also be increased.

For example, provided that the other conditions of the chemical strengthening treatment are the same, when a soda lime silicate glass is immersed in a potassium nitrate solution at 400° C. for 3.6 hours, during which microwave radiation is applied for 20 min, the soda lime silicate glass can have a compressive stress of 400-500 MPa and a thickness of layer of compressive stress in the range of 20-25 μm; however, the soda lime silicate glass generally has a compressive stress of 300-400 MPa and a thickness of layer of compressive stress in the range of 10-20 μm without using the microwave radiation. When an alkali aluminosilicate glass is immersed in a potassium nitrate solution at 410° C. for 3.5 hours, during which microwave radiation is applied for 20 min, the alkali aluminosilicate glass has a compressive stress of 670-710 MPa and a thickness of layer of compressive stress in the range of 60-65 μm. However, it needs about 4.6 hours to achieve the same compressive stress value and the same depth of layer of compressive stress without using microwave radiation.

By using an ultrasonic wave and/or a microwave during the chemical strengthening, as described in the present application, it is easier to make the value of the crack resistance factor K of a prepared glass plate be less than 8.

The present invention is further described below by means of examples, but the present invention is not limited thereto. In the following examples of the present invention, the reagents used are all commercially available products.

DETAILED DESCRIPTION OF EMBODIMENTS

Specific embodiments of the present invention are described in detail below. It should be understood that the specific embodiments described herein are merely illustration and explanation of the present invention and are not intended to limit the present invention.

Tables 1 and 2 show the components of glasses and the contents thereof, as well as the process parameters of the preparation of the glass in Examples 1-10 and Comparative Examples 1-5.

There is no particular limitation on the preparation of molten glass, and hereinafter the preparation steps are described taking Example 1 as an example as follows:

Appropriate amounts of various raw materials are mixed, placed in a crucible made from platinum and heated to about 1,400° C. to 1,600° C. to melt them, and after being defoamed and homogenized, the mixture is poured into a mould and annealed to obtain a glass block. The glass block is then cut and ground to obtain a glass plate having a thickness of 0.5 mm, and the glass plate is cut into a desired size (65 mm*135 mm).

The glass plate is immersed in a molten salt of potassium nitrate ($KNO_3$), wherein the temperature of the molten salt and the immersion time are specifically shown in the table; and the specific parameters for the ultrasonic treatment and the microwave treatment are also detailed in the table.

The compressive stress S (unit: MPa) and the thickness t (unit: μm) of the layer of compressive stress are measured by using methods known in the art. Such methods include, but are not limited to, measuring surface stress (FSM) using, for example, FSM-6000 manufactured by Luceo Co., Ltd. (Tokyo, Japan) or a similar commercial instrument, and in the examples and comparative examples in the present invention, the compressive stress and the depth of layer of compressive stress are measured by using FSM-6000 manufactured by Luceo Co., Ltd. (Tokyo, Japan), specifically by means of methods as described in ASTM 1422C-99 entitled "Standard Specification for Chemically Strengthened Flat Glass", and as described in ASTM 1279.19779 entitled "Standard Test Method for Non-Destructive Photoelastic Measurement of Edge and Surface Stresses in Annealed, Heat-Strengthened, and Fully Tempered Flat Glass", which are incorporated herein by reference in their entirety. The measurement of surface stress relies on the accurate measurement of stress optical coefficient (SOC), which is related to the birefringence of a stress-induced glass.

The instrument has the following parameters:
Measurement range: 0-1000 MPa
Measurement accuracy: ±20 MPa
Measurement range (depth of layer of stress): 10-100 μm
Accuracy (depth of layer of stress): ±5 μm
Light source: High-brightness LED light source produced by Orihara corporation
Measurement shape: flat glass, 10×10 mm or larger
Prism: size=12*7 mm RI=1.72/590 nm During measurement, the two surfaces of the glass plate are subjected to mirror polish, grinding or etching to eliminate 3 μm of the surfaces, and after measurement, the glass is further polished, ground or etched by 4 μm.

A falling ball used in a falling ball impact test is made from stainless steel, and has a mass of 130 g and a diameter of 31.5 cm. During testing, the glass is placed on a bakelite plate mould made from a phenolic resin material, as conventionally used in the art, the above-mentioned steel ball is dropped from different heights, and by dropping ball multiple times, a simple average value of the ball drop height at which cracking occurs is calculated, as a crack height.

With regard to the resistance of the glass to slow cracking, if the glass plate is left to stand, the time consumed for observing the slow cracking thereof is too long; therefore, a glass plate in which a microcrack appears is placed on a vibrator to accelerate the cracking thereof for the purpose of testing. The change in the length of the crack is observed, and the times (min) required for the crack reaching 10 mm, 15 mm and 20 mm are recorded.

The vibrator may be any commercially available vibrator as long as the same vibrator and operating parameters are used in the examples and comparative examples. For example, a pneumatic vibrator (QSE small environmentally friendly vibrator, such as QSE-20, with a vibration force of 10 N, a frequency of 7-70 Hz, a noise of 25 db, and a working temperature of −10° C. to 70° C.) produced by Yantai JieShun Pneumatic Equipment Manufacturing Co., Ltd is used in the examples and comparative examples in the present invention, and during operation, the flat glass to be tested is placed above the vibrator.

TABLE 1

|  | Example 1 | Example 2 | Example 3 | Example 4 | Example 5 | Example 6 | Example 7 |
|---|---|---|---|---|---|---|---|
| $SiO_2$ | 100 | 100 | 100 | 100 | 100 | 100 | 100 |
| $Al_2O_3$ | 17 | 18 | 25 | 25 | 15 | 20 | 22 |
| $Na_2O$ | 15 | 16 | 22 | 24 | 13 | 14 | 23 |
| $K_2O$ | 7 | 9 | 8 | 8 | 6 | 10 | 7 |
| MgO | 8 | 10 | 9 | 7 | 9 | 8 | 9 |
| CaO | 0.5 | 0 | 0.4 | 0 | 0.5 | 0.1 | 0.2 |
| $ZrO_2$ | 5 | 3 | 0.8 | 0.5 | 3.2 | 3 | 2 |
| BaO | 0.5 | 0.7 | 0.6 | 0 | 0.8 | 0.9 | 0.3 |
| SrO | 0.5 | 0 | 0.6 | 0 | 0.7 | 0.8 | 0.5 |
| M ($P_1$ = 0.53, $P_2$ = 0.153, $P_3$ = 0.36, $P_4$ = 0.67, and $P_5$ = 0.018) | 10.0 | 9.6 | 5.4 | 5.5 | 9.1 | 6.6 | 9.1 |
| The surface compressive stress value at a depth of 3 μm, S (MPa) | 689 | 672 | 670 | 660 | 650 | 580 | 560 |
| The surface compressive stress value at a depth of 7 μm, S (MPa) | 595 | 580 | 578 | 573 | 560 | 450 | 430 |
| Depth of layer of compressive stress, t (μm) | 37.8 | 39.2 | 38.8 | 38.3 | 36.7 | 31.5 | 30.8 |
| K ($Q_1$ = 3.5, $Q_2$ = 1.8, and $Q_3$ = 0.12) | 6.3 | 6.3 | 6.5 | 6.7 | 6.4 | 7.8 | 7.9 |
| Ultrasonic treatment acoustic energy density (W/L) | 55 | 57 | 55 | 50 | 60 | — | — |
| Ultrasonic frequency (kHz) | 30 | 27 | 30 | 25 | 40 | — | — |
| Ultrasonic treatment temperature (° C.) | 400 | 390 | 420 | 380 | 425 | — | — |
| Ultrasonic treatment time (min) | 25 | 20 | 22 | 10 | 8 | — | — |
| Time interval (min) | 12 | 18 | 15 | 5 | 12 | — | — |
| Microwave treatment (GHz) | 3.0 | 3.5 | 3.3 | 2.6 | 3.0 | — | — |
| Microwave treatment time (min) | 15 | 12 | 17 | 13 | 10 | — | — |
| Time interval (min) | — | 10 | 15 | 5 | — | — | — |

TABLE 1-continued

|  | Example 1 | Example 2 | Example 3 | Example 4 | Example 5 | Example 6 | Example 7 |
| --- | --- | --- | --- | --- | --- | --- | --- |
| Remarks | After ultrasonic treatment, there is a time interval of 12 min before microwave treatment, and after the microwave treatment, the next round of ultrasonic treatment is carried out. | After ultrasonic treatment, there is a time interval of 18 min before microwave treatment, and after the microwave treatment, there is a time interval of 10 min before the next round of ultrasonic treatment. | After ultrasonic treatment, there is a time interval of 15 min before microwave treatment, and after the microwave treatment, there is a time interval of 15 min before the next round of ultrasonic treatment. | After ultrasonic treatment, there is a time interval of 5 min before microwave treatment, and after the microwave treatment, there is a time interval of 5 min before the next round of ultrasonic treatment. | After ultrasonic treatment, there is a time interval of 12 min before microwave treatment, and after the microwave treatment, the next round of ultrasonic treatment is carried out. | — | — |
| Molten salt temperature, immersion time | 420□, 4 h | 420□, 4 h | 420□, 4 h | 400□, 4.5 h | 400□, 4.5 h | 410□, 3 h | 410□, 3 h |
| Chemical resistance to 10% HF acid/20° C./20 min (mg/cm$^2$) | 34 | 35 | 32 | 30 | 30 | 36 | 37 |
| Young's modulus (GPa) | 86.5 | 89.8 | 79.8 | 75.4 | 74.8 | 68.4 | 67.4 |
| Average ball drop height at which cracking occurs (cm) (the falling ball has a mass of 130 g, and a diameter of 31.5 cm) | 52 | 54 | 53 | 50 | 49 | 42 | 40 |
| Vibration test (the time required for crack reaching 10 mm, 15 mm and 20 mm, respectively (min)) | 19<br>31<br>46 | 17<br>27<br>39 | 18<br>30<br>45 | 16<br>26<br>38 | 14<br>22<br>37 | 11<br>19<br>30 | 10<br>20<br>32 |

TABLE 2

|  | Example 8 | Example 9 | Example 10 | Example 11 | Comparative Example 1 | Comparative example 2 | Comparative example 3 | Comparative Example 4 |
| --- | --- | --- | --- | --- | --- | --- | --- | --- |
| $SiO_2$ | 100 | 100 | 100 | 100 | 100 | 100 | 100 | 100 |
| $Al_2O_3$ | 20 | 20 | 22 | 22 | 15 | 21 | 20 | 22 |
| $Na_2O$ | 19 | 19 | 18 | 18 | 24 | 13 | 13 | 17 |
| $K_2O$ | 9 | 9 | 10 | 10 | 9 | 7 | 6 | 6 |
| MgO | 10 | 10 | 9 | 9 | 9 | 7 | 8 | 7 |
| CaO | 0 | 0.6 | 0.3 | 0 | 1 | 0.6 | 0.2 | 0.2 |
| $ZrO_2$ | 0.9 | 0.9 | 0.7 | 0.7 | 3 | 2 | 0.6 | 1 |
| BaO | 0 | 0.7 | 0.9 | 0 | 0.9 | 0.8 | 0.9 | 0.9 |
| SrO | 0 | 1.2 | 1 | 0 | 2 | 1.0 | 1.1 | 1.1 |
| M ($P_1 = 0.53$, $P_2 = 0.153$, $P_3 = 0.36$, $P_4 = 0.67$, and $P_5 = 0.018$) | 8.5 | 8.5 | 6.0 | 6.0 | 15.3 | 3.9 | 3.9 | 4.4 |

TABLE 2-continued

| | Example 8 | Example 9 | Example 10 | Example 11 | Comparative Example 1 | Comparative example 2 | Comparative example 3 | Comparative Example 4 |
|---|---|---|---|---|---|---|---|---|
| The surface compressive stress value at a depth of 3 μm, S (MPa) | 714 | 690 | 650 | 640 | 560 | 530 | 540 | 590 |
| The surface compressive stress value at a depth of 7 μm, S (MPa) | 625 | 608 | 536 | 545 | 400 | 390 | 400 | 445 |
| Depth of layer of compressive stress, t (μm) | 45.9 | 44.8 | 35.8 | 36.1 | 22.5 | 21.5 | 25.8 | 28.5 |
| K ($Q_1$ = 3.5, $Q_2$ = 1.8, and $Q_3$ = 0.12) | 6.1 | 6.0 | 6.9 | 6.5 | 9.1 | 8.7 | 8.5 | 8.2 |
| Ultrasonic treatment acoustic energy density (W/L) | 55 | 56 | 56 | 55 | — | — | — | 55 |
| Ultrasonic frequency (kHz) | 30 | 32 | 32 | 30 | — | — | — | 30 |
| Ultrasonic treatment temperature (° C.) | 400 | 410 | 410 | 400 | — | — | — | 400 |
| Ultrasonic treatment time (min) | 35 | 20 | 25 | 15 | — | — | — | 25 |
| Time interval (min) | 10 | 12 | 12 | 10 | — | — | — | 9 |
| Microwave treatment (GHz) | 3.0 | 3.5 | 3.5 | 3.0 | — | — | — | 3.0 |
| Microwave treatment time (min) | 15 | 10 | 10 | 20 | — | — | — | 10 |
| Time interval (min) | 8 | 9 | 12 | 10 | — | — | — | 8 |
| Remarks | After ultrasonic treatment, there is a time interval of 10 min before microwave treatment, and after the microwave treatment, there is a time interval of 8 min before the next round of ultrasonic treatment. | After ultrasonic treatment, there is a time interval of 12 min before microwave treatment, and after the microwave treatment, there is a time interval of 9 min before the next round of ultrasonic treatment. | After ultrasonic treatment, there is a time interval of 12 min before microwave treatment, and after the microwave treatment, there is a time interval of 12 min before the next round of ultrasonic treatment. | After ultrasonic treatment, there is a time interval of 10 min before microwave treatment, and after the microwave treatment, there is a time interval of 10 min before the next round of ultrasonic treatment. | — | — | — | After ultrasonic treatment, there is a time interval of 9 min before microwave treatment, and after the microwave treatment, there is a time interval of 8 min before the next round of ultrasonic treatment. |
| Molten salt temperature, immersion time | 420□, 5 h | 400□, 4.5 h | 400□, 4.5 h | 400□, 4.5 h | 400□, 4.5 h | 400□, 4.5 h | 420□, 3 h | 420□, 3 h |
| Chemical resistance to 10% HF acid/20° C./20 min (mg/cm²) | 32 | 33 | 33 | 30 | 48 | 55 | 47 | 41 |

TABLE 2-continued

|  | Example 8 | Example 9 | Example 10 | Example 11 | Comparative Example 1 | Comparative example 2 | Comparative example 3 | Comparative Example 4 |
|---|---|---|---|---|---|---|---|---|
| Young's modulus (GPa) | 76.4 | 75.6 | 74.8 | 75 | 61.7 | 60.8 | 62.5 | 65.5 |
| Average ball drop height at which cracking occurs (cm) (the falling ball has a mass of 130 g, and a diameter of 31.5 cm) | 55 | 57 | 54 | 51 | 30 | 31 | 32 | 36 |
| Vibration test (the time required for crack reaching 10 mm, 15 mm and 20 mm, respectively (min)) | 20 35 48 | 21 37 49 | 18 32 43 | 19 33 44 | 4 12 20 | 5 13 17 | 3 13 21 | 8 18 27 |

TABLE 3

|  | Example 12 | Example 13 | Example 14 | Example 15 | Comparative Example 5 | Comparative Example 6 | Comparative Example 7 |
|---|---|---|---|---|---|---|---|
| $SiO_2$ | 100 | 100 | 100 | 100 | 100 | 100 | 100 |
| $Al_2O_3$ | 28 | 18 | 27 | 23 | 14 | 29 | 14 |
| $Na_2O$ | 25 | 17 | 23 | 17 | 12 | 28 | 6.8 |
| $K_2O$ | 15 | 12 | 14 | 11 | 5 | 18 | 18 |
| MgO | 11 | 11 | 16 | 15 | 6 | 6.5 | 6.5 |
| CaO | 1.5 | 1.2 | 0.7 | 0.8 | 2.5 | 2.2 | 2.8 |
| $ZrO_2$ | 0.1 | 3.8 | 0.2 | 0.4 | 6 | 7.8 | 7.8 |
| BaO | 0.4 | 0.2 | 1.2 | 1.1 | 2.2 | 2.4 | 2.6 |
| SrO | 0.2 | 0.1 | 3 | 1.5 | 3.2 | 3.3 | 3.5 |
| M ($P_1$ = 0.53, $P_2$ = 0.153, $P_3$ = 0.36, $P_4$ = 0.67, and $P_5$ = 0.018) | 5.5 | 11.5 | 7.1 | 7.2 | 9.7 | 10.0 | 10.4 |
| The surface compressive stress value at a depth of 3 μm, S (MPa) | 685 | 668 | 675 | 670 | 560 | 584 | 566 |
| The surface compressive stress value at a depth of 7 μm, S (MPa) | 590 | 577 | 582 | 563 | 418 | 428 | 426 |
| Depth of layer of compressive stress, t (μm) | 36.8 | 35.2 | 34.8 | 38.6 | 26.6 | 24.3 | 25.8 |
| K ($Q_1$ = 3.5, $Q_2$ = 1.8, and $Q_3$ = 0.12) | 6.4 | 6.4 | 6.4 | 6.6 | 8.4 | 8.7 | 8.3 |
| Ultrasonic treatment acoustic energy density (W/L) | 55 | 57 | 55 | 50 | 55 | 50 | 57 |

TABLE 3-continued

|  | Example 12 | Example 13 | Example 14 | Example 15 | Comparative Example 5 | Comparative Example 6 | Comparative Example 7 |
|---|---|---|---|---|---|---|---|
| Ultrasonic frequency (kHz) | 30 | 27 | 30 | 25 | 30 | 25 | 27 |
| Ultrasonic treatment temperature (° C.) | 400 | 390 | 420 | 380 | 400 | 380 | 390 |
| Ultrasonic treatment time (min) | 25 | 20 | 22 | 10 | 20 | 10 | 20 |
| Time interval (min) | 12 | 18 | 15 | 5 | 12 | 5 | 18 |
| Microwave treatment (GHz) | 3.0 GHz | 3.5 GHz | 3.3 GHz | 2.6 GHz | 3.0 GHz | 2.6 GHz | 3.5 GHz |
| Microwave treatment time (min) | 15 | 12 | 17 | 13 | 15 | 13 | 12 |
| Time interval (min) | 10 | 10 | 15 | 5 | 10 | 5 | 10 |
| Remarks | After ultrasonic treatment, there is a time interval of 12 min before microwave treatment, and after the microwave treatment, the next round of ultrasonic treatment is carried out. | After ultrasonic treatment, there is a time interval of 18 min before microwave treatment, and after the microwave treatment, there is a time interval of 10 min before the next round of ultrasonic treatment. | After ultrasonic treatment, there is a time interval of 15 min before microwave treatment, and after the microwave treatment, there is a time interval of 15 min before the next round of ultrasonic treatment. | After ultrasonic treatment, there is a time interval of 5 min before microwave treatment, and after the microwave treatment, there is a time interval of 5 min before the next round of ultrasonic treatment. | After ultrasonic treatment, there is a time interval of 12 min before microwave treatment, and after the microwave treatment, the next round of ultrasonic treatment is carried out. | After ultrasonic treatment, there is a time interval of 5 min before microwave treatment, and after the microwave treatment, there is a time interval of 5 min before the next round of ultrasonic treatment. | After ultrasonic treatment, there is a time interval of 18 min before microwave treatment, and after the microwave treatment, there is a time interval of 10 min before the next round of ultrasonic treatment. |
| Molten salt temperature, immersion time | 410□, 4 h | 410□, 4 h | 410□, 4 h | 420□, 4.5 h | 410□, 4 h | 420□, 4 h | 420□, 4 h |
| Chemical resistance to 10% HF acid/20° C./20 min (mg/cm$^2$) | 34 | 35 | 32 | 34 | 41 | 42 | 42 |
| Young's modulus (GPa) | 79.1 | 76.8 | 79.8 | 75.4 | 66.2 | 65.6 | 66.8 |
| Average ball drop height at which cracking occurs (cm) (the falling ball has a mass of 130 g, and a diameter of 31.5 cm) | 49 | 44 | 48 | 50 | 38 | 38 | 35 |
| Vibration test (the time required for crack reaching 10 mm, 15 mm and 20 mm, respectively (min)) | 13<br>26<br>38 | 15<br>27<br>42 | 13<br>28<br>39 | 14<br>26<br>38 | 8<br>16<br>26 | 6<br>15<br>28 | 8<br>18<br>28 |

As shown in Tables 1-3, the contents of the various components of the glass compositions and the values of M thereof in Examples 1-5 and 8-15 fall within the ranges of the present invention. In contrast, although the contents of the various components of the glass composition in Comparative Example 4 fall within the ranges of the present invention, the value M thereof is out of the range of the present invention; and although the values of M of the glass compositions in Comparative Example 5-7 fall within the ranges of the present invention, the contents of the various components thereof are out of the ranges of the present invention. In contrast, the glass products in Examples 1-5 and 8-15 are all superior to those in Comparative Examples 4-7 in terms of chemical resistance and Young's modulus, and also superior to those in Comparative Examples 4-7 in terms of the average height at which the glass plate cracks in the falling ball test, and the times required for crack reaching 10 mm, 15 mm and 20 mm, respectively, in the vibration test are longer than those in Comparative Examples 4-7, i.e., having a preferred resistance to slow cracking.

It can be seen that with respect to the cases where only the contents of the various components in the glass composition satisfy the ranges of the present invention or only the value of M satisfies the range of the present invention, the cases where the contents of the various components and the value of M both satisfy the ranges of the present invention can produce unexpected technical effects in terms of chemical resistance, Young's modulus, and crack resistance of the glass products.

Furthermore, it can be seen from Tables 1 and 2 that Examples 1-11, in which the contents of various components in the glass compositions satisfy the ranges of the present invention, the values of M satisfy a range of 5-13, and the values of the crack resistance factor K are less than 8, are superior to Comparative Examples 1-4 in terms of the chemical resistance and Young's modulus, and also superior to Comparative Examples 1-4 in terms of the average height at which the glass plate cracks in the falling ball test, and the times required for crack reaching 10 mm, 15 mm and 20 mm, respectively, in the vibration test are longer than those in Comparative Examples 1-4, i.e., having a preferred resistance to slow cracking.

Further preferably, where the contents of various components satisfy the ranges of the present invention and the value of M satisfies the range of 5-13, if no ultrasonic treatment or ultrasonic and microwave treatment is applied during the chemical strengthening, the performances such as chemical resistance, Young's modulus, the height at which the glass plate cracks, times required for crack reaching certain lengths in the vibration test and the like are all inferior to those of a glass plate having been subjected to ultrasonic treatment or ultrasonic and microwave treatment during the chemical strengthening. For details, reference can be made to the data of Example 6 and Example 7, and the values of M therein are respectively 6.6 and 9.1, which satisfy the range of 5-13, but these examples are not subjected to ultrasonic and microwave treatment during the chemical strengthening; consequently, the values of the crack resistance factor K are relatively high, and are 7.8 and 7.9, respectively. The Young's moduli are 68.4 GPa and 67.4 GPa, respectively, which are lower than those in the other samples (Examples 1-5 and 8-11) which have been subjected to ultrasonic and microwave treatment during the chemical strengthening, but also higher than the values in Comparative Examples 1-4; the average heights at which the glass plate cracks in the falling ball test are slightly less than those in Examples 1-5 and 8-11, but higher than those in Comparative Examples 1-4; and the times required for crack reaching certain lengths in the vibration test are also shorter than those in Examples 1-5 and 8-11, but longer than those in Comparative Examples 1-4, that is to say, the resistance to slow cracking is worse than that in Examples 1-5 and 8-11, but superior to that in Comparative Examples 1-4.

For Comparative Example 4, the value of M is 4.4, which is not in the range of 5-13, but ultrasonic treatment and microwave treatment are carried out during the chemical strengthening; it can be seen by comparison that the surface compressive stresses values at 3 μm and 7 μm and the crack resistance factor K are both better than those in Comparative Examples 1-3, the chemical resistance thereof to 10% HF acid/20° C./20 min is 41 mg/cm$^2$, the Young's modulus is 65.5 GPa, and the ball drop height at which cracking occurs is 36 cm, which are all superior to the corresponding performances in Comparative Examples 1-3. In the vibration test, the times required for the crack reaching 10 mm, 15 mm and 20 mm, respectively, are 8 min, 18 min, and 27 min, respectively, which are all longer than those in Comparative Examples 1-3, that is to say, although the value of M does not satisfy the range of 5-13, the obtained glass plate sample can also have a relatively good resistance to slow cracking if the sample has been subjected to ultrasonic treatment and microwave treatment.

The preferred embodiments of the present invention have been described in detail above, but the present invention is not limited to the specific details in the above embodiments; various simple modifications can be made to the technical solutions of the present invention within the scope of the technical concept of the present invention, and these simple modifications all fall within the scope of protection of the present invention.

It is to be further noted that the specific technical features described in the above-mentioned specific embodiments may be combined in any suitable manner without contradiction. In order to avoid unnecessary repetition, the present invention will not be further described with regard to various possible combinations.

In addition, any combination of various embodiments of the present invention may be made as long as the combination does not depart from the concept of the present invention, and such a combination should also be regarded as the disclosure of the present invention.

The invention claimed is:

1. A glass composition, consisting of $SiO_2$, $Al_2O_3$, $Na_2O$, $K_2O$, MgO and $ZrO_2$,
    wherein the content of $Al_2O_3$ is 15-28 parts by weight, the content of $Na_2O$ is 13-25 parts by weight, the content of $K_2O$ is 6-15 parts by weight, the content of MgO is 7-16 parts by weight, and the content of $ZrO_2$ is 0.1-5 parts by weight, relative to 100 parts by weight of $SiO_2$;
    wherein the glass composition has an M value of 5-13, as calculated by the following formula (1):

$$M=P_1*wt(Na_2O)+P_2*wt(K_2O)+P_3*wt(MgO)+P_4*wt(ZrO_2)-P_5*wt(Al_2O_3)*wt(Al_2O_3) \quad (1),$$

wherein wt ($Na_2O$) represents the part by weight of $Na_2O$ relative to 100 parts by weight of $SiO_2$,
    wt ($K_2O$) represents the part by weight of $K_2O$ relative to 100 parts by weight of $SiO_2$,
    wt (MgO) represents the part by weight of MgO relative to 100 parts by weight of $SiO_2$,
    wt ($ZrO_2$) represents the part by weight of $ZrO_2$ relative to 100 parts by weight of $SiO_2$, and wt (Al$_2$O$_3$) represents the part by weight of Al$_2$O$_3$ relative to 100 parts by weight of SiO$_2$;

wherein P$_1$ has a value of 0.53, P$_2$ has a value of 0.153, P$_3$ has a value of 0.36, P$_4$ has a value of 0.67, and P$_5$ has a value of 0.018, wherein the change in the value of M is presented as a curve having an optimal point value, and wherein the composition prevents rapid cracking and spontaneous burst after collision, or slow cracking after the collision.

2. The glass composition according to claim 1, wherein the value of M is 7-8.

3. The glass composition according to claim 1, wherein the content of Al$_2$O$_3$ is 18-25 parts by weight, the content of Na$_2$O is 17-23 parts by weight, the content of K$_2$O is 7-12 parts by weight, the content of MgO is 8-14 parts by weight, and the content of ZrO$_2$ is 0.8-2 parts by weight, relative to 100 parts by weight of SiO$_2$.

4. The glass composition according to claim 1, wherein said glass composition has a 10% HF acid/20° C./20 min corrosion amount of less than 38 mg/cm$^2$.

5. The glass composition according to claim 1, wherein said glass composition has a Young's modulus of higher than 75 GPa.

6. A glass plate, characterized in that said glass plate is made from the glass composition according to claim 1, wherein the ratio of a surface compressive stress value at a depth of 3 μm of said glass plate to that at a depth of 7 μm, and the thickness of a layer of compressive stress are calculated by the following formula (2), and the resulting value of the crack resistance factor K should be less than 8:

$$K=Q_1*(x/y)^2+Q_2*(x/y)-Q_3*d/10 \qquad (2)$$

wherein x is the surface compressive stress value at a depth of 3 μm of the glass plate, and y is the surface compressive stress value at a depth of 7 μm of the glass plate, in unit of MPa; and d represents the thickness of a layer of compressive stress, in unit of μm;

wherein Q$_1$ has a value of 3.5, Q$_2$ has a value of 1.8, and Q$_3$ has a value of 0.12;

wherein said glass plate has a 10% HF acid/20° C./20 min corrosion amount of less than 38 mg/cm2; and wherein the glass plate prevents rapid cracking and spontaneous burst after collision, or slow cracking after the collision.

7. The glass plate according to claim 6, wherein the value of K is less than 7.3.

8. A method for preparing the glass plate according to claim 6, said method comprising:

manufacturing the glass composition into a plate-shaped article, subjecting to chemical strengthening by immersing the plate-shaped article in a molten salt of a nitrate, or immersing said plate-shaped article in a molten salt of sodium nitrate (NaNO$_3$), or in a molten salt of potassium nitrate (KNO$_3$), or in a mixed molten salt thereof, or first immersing said plate-shaped article in a molten salt of sodium nitrate (NaNO$_3$) and then immersing in a molten salt of potassium nitrate (KNO$_3$).

9. The preparation method according to claim 8, wherein during the chemical strengthening, the temperature of the molten salt is 400° C., and the immersion time is 4-5 hours.

10. The preparation method according to claim 9, wherein an ultrasonic treatment is added during the chemical strengthening, wherein after one ultrasonic treatment is done, there is a time interval before a second ultrasonic treatment.

11. The preparation method according to claim 10, wherein the ultrasonic wave in said ultrasonic treatment has an average acoustic energy density of 50-60 W/L and an ultrasonic frequency of 25-40 kHz.

12. The preparation method according to claim 10, wherein the temperature of said ultrasonic treatment is 3390° C.-410° C., and the treatment time is 20-40 min.

13. The preparation method according to claim 10, wherein said ultrasonic treatment is carried out at intervals, wherein said ultrasonic treatment is carried out at intervals, wherein the time interval between ultrasonic treatments 5-20 min; and the ultrasonic treatment time each time is 20-40 min.

14. The preparation method according to claim 10, wherein while performing the chemical strengthening, with ion exchange, microwave radiation is applied to the surface of the glass, preferably performed alternately with the ultrasonic treatment.

15. The preparation method according to claim 14, wherein the frequency range of the microwave is 3.3-3.5 GHz.

16. The preparation method according to claim 14, wherein the duration of application of the microwave is 12-25 min.

17. The preparation method according to claim 14, wherein the time interval of application of the microwave is 7-15 min; and the duration of application of the microwave each time is 12-25 min.

18. A glass composition consisting of SiO$_2$, Al$_2$O$_3$, Na$_2$O, K$_2$O, MgO, ZrO$_2$ and Sro, wherein the content of Al$_2$O$_3$ is 15-28 parts by weight, the content of Na$_2$O is 13-25 parks by weight, the content of K$_2$O is 6-15 parts by weight, the content of MgO is 7-16 parts by weight, and the content of ZrO$_2$ is 0.1-5 parts by weight, relative to 100 parts by weight of SiO$_2$;

and wherein the glass composition has an M value of 5-13, as calculated by the following formula (1):

$$M=P_1*wt(Na_2O)+P_2*wt(K_2O)+P_3*wt(MgO)+P_4*wt(ZrO_2)-P_5*wt(Al_2O_3)*wt(Al_2O_3) \qquad (1)$$

wherein wt (Na$_2$O) represents the part by weight of Na$_2$O relative to 100 parts by weight of SiO$_2$, wt (K$_2$O) represents the part of by weight of K$_2$O relative to 100 parts by weight of SiO$_2$, wt (MgO) represents the part of by weight of MgO relative to 100 parts by weight of SiO$_2$, wt (ZrO$_2$) represents the part of by weight of ZrO$_2$ relative to 100 parts by weight of SiO$_2$, and wt (Al$_2$O$_3$) represents the part of by weight of Al$_2$O$_3$ relative to 100 parts by weight of SiO$_2$;

and wherein P$_1$ has a value of 053, P$_2$ has a value of 0.153, P$_3$ has a value of 0.36, P$_4$ has a value of 0.67, and P$_5$ has a value of 0.018, wherein the change in the value of M is presented as a curve having an optimal point value, and wherein the composition prevents rapid cracking and spontaneous burst after collision, or slow cracking after the collision;

the content of SrO being more than 0 and less than 0.6 parts by weight, relative to 100 parts by weight of SiO$_2$.

19. A glass composition consisting of SiO$_2$, Al$_2$O$_3$, Na$_2$O, K$_2$O, MgO, ZrO$_2$ and CaO, wherein the content of Al$_2$O$_3$ is 15-28 parts by weight, the content of Na$_2$O is 13-25 parks by weight, the content of K$_2$O is 6-15 parts by weight, the content of MgO is 7-16 parts by weight, and the content of ZrO$_2$ is 0.1-5 parts by weight, relative to 100 parts by weight of SiO$_2$;

and wherein the glass composition has an M value of 5-13, as calculated by the following formula (1):

$$M=P_1*wt(Na_2O)+P_2*wt(K_2O)+P_3*wt(MgO)+P_4*wt(ZrO_2)-P_5*wt(Al_2O_3)*wt(Al_2O_3) \quad (1)$$

wherein wt ($Na_2O$) represents the part by weight of $Na_2O$ relative to 100 parts by weight of $SiO_2$, wt ($K_2O$) represents the part of by weight of $K_2O$ relative to 100 parts by weight of $SiO_2$, wt (MgO) represents the part of by weight of MgO relative to 100 parts by weight of $SiO_2$, wt ($ZrO_2$) represents the part of by weight of $ZrO_2$ relative to 100 parts by weight of $SiO_2$, and wt ($Al_2O_3$) represents the part of by weight of $Al_2O_3$ relative to 100 parts by weight of $SiO_2$;

and wherein $P_1$ has a value of 053, $P_2$ has a value of 0.153, $P_3$ has a value of 0.36, $P_4$ has a value of 0.67, and $P_5$ has a value of 0.018, wherein the change in the value of M is presented as a curve having an optimal point value, and wherein the composition prevents rapid cracking and spontaneous burst after collision, or slow cracking after the collision;

the content of BaO being more than 0 and less than 0.5 parts by weight, and the content of CaO being more than 0 and less than 0.5 parts by weight, relative to 100 parts by weight of $SiO_2$.

\* \* \* \* \*